United States Patent
Olson et al.

(10) Patent No.: US 9,477,226 B2
(45) Date of Patent: Oct. 25, 2016

(54) WIRELESSLY CONTROLLING UNMANNED AIRCRAFT AND ACCESSING ASSOCIATED SURVEILLANCE DATA

(75) Inventors: Steven J. Olson, Hood River, OR (US); Matt Wheeler, White Salmon, OR (US)

(73) Assignee: Insitu, Inc., Bingen, WA (US)

( * ) Notice: Subject to any disclaimer, the term of this patent is extended or adjusted under 35 U.S.C. 154(b) by 531 days.

(21) Appl. No.: 12/537,070

(22) Filed: Aug. 6, 2009

(65) Prior Publication Data

US 2010/0224732 A1 Sep. 9, 2010

Related U.S. Application Data

(63) Continuation of application No. 11/449,927, filed on Jun. 9, 2006, now Pat. No. 7,581,702.

(51) Int. Cl.
| | |
|---|---|
| *B64C 13/20* | (2006.01) |
| *G05D 1/00* | (2006.01) |
| *H04W 4/00* | (2009.01) |
| *H04W 4/04* | (2009.01) |
| *B64C 39/02* | (2006.01) |

(52) U.S. Cl.
CPC .......... *G05D 1/0022* (2013.01); *H04W 4/005* (2013.01); *H04W 4/046* (2013.01); *B64C 39/024* (2013.01); *B64C 2201/146* (2013.01)

(58) Field of Classification Search
CPC ....................... G05D 1/0022; B64C 2201/146
USPC ........................................ 244/190; 348/144
See application file for complete search history.

(56) References Cited

U.S. PATENT DOCUMENTS

| | | | |
|---|---|---|---|
| 5,200,987 A | | 4/1993 | Gray |
| 5,499,050 A | * | 3/1996 | Baldes et al. ................. 348/180 |
| 5,521,817 A | * | 5/1996 | Burdoin et al. ................. 701/3 |
| 6,018,659 A | | 1/2000 | Ayyagari et al. |
| 6,315,667 B1 | | 11/2001 | Steinhart |
| 6,477,463 B2 | | 11/2002 | Hamilton |
| 6,498,968 B1 | | 12/2002 | Bush |
| 6,752,720 B1 | | 6/2004 | Clapper et al. |

(Continued)

FOREIGN PATENT DOCUMENTS

| | | |
|---|---|---|
| EP | 0837567 | 4/1998 |
| JP | 10150401 A | 6/1998 |
| JP | 2001230722 A | 8/2001 |
| JP | 2001283400 A | 10/2001 |
| JP | 2003032739 | 1/2003 |

OTHER PUBLICATIONS

Schaphorst, Richard. An Overview of Video Compression in the Tactical Battlefield. pp. 843-847. 1993.*

(Continued)

*Primary Examiner* — Brian M O'Hara
*Assistant Examiner* — Michael Kreiner
(74) *Attorney, Agent, or Firm* — Perkins Coie LLP

(57) ABSTRACT

Controlling an unmanned aerial vehicle (UAV) may be accomplished by using a wireless device (e.g., cell phone) to send a control message to a receiver at the UAV via a wireless telecommunication network (e.g., an existing cellular network configured primarily for mobile telephone communication). In addition, the wireless device may be used to receive communications from a transmitter at the UAV, wherein the wireless device receives the communications from the transmitter via the wireless network. Examples of such communications include surveillance information and UAV monitoring information.

47 Claims, 8 Drawing Sheets

(56) References Cited

U.S. PATENT DOCUMENTS

| | | |
|---|---|---|
| 6,917,863 B2 | 7/2005 | Matos |
| 7,031,728 B2 | 4/2006 | Beyer, Jr. |
| 7,121,507 B2 | 10/2006 | Dennis et al. |
| 7,148,843 B2 | 12/2006 | Han et al. |
| 7,231,294 B2 | 6/2007 | Bodin et al. |
| 7,252,265 B2 | 8/2007 | Perlo et al. |
| 7,274,676 B2* | 9/2007 | Cardei et al. ............... 370/328 |
| 7,286,913 B2 | 10/2007 | Bodin et al. |
| 7,469,183 B2* | 12/2008 | Bodin et al. .................. 701/23 |
| 7,581,702 B2 | 9/2009 | Olson et al. |
| 7,624,943 B2 | 12/2009 | Cerchie et al. |
| 7,630,724 B2 | 12/2009 | Beyer, Jr. et al. |
| 7,784,741 B2 | 8/2010 | Cerchie et al. |
| 8,052,096 B2 | 11/2011 | Cerchie et al. |
| 2005/0018627 A1* | 1/2005 | Cardei et al. ............... 370/328 |
| 2005/0048918 A1 | 3/2005 | Frost et al. |
| 2005/0076054 A1 | 4/2005 | Moon et al. |
| 2005/0094851 A1* | 5/2005 | Bodin et al. ................. 382/106 |
| 2006/0271251 A1 | 11/2006 | Hopkins |
| 2007/0050104 A1 | 3/2007 | Wallace et al. |
| 2007/0073436 A1 | 3/2007 | Sham |
| 2007/0288132 A1* | 12/2007 | Lam .............................. 701/23 |
| 2008/0060034 A1 | 3/2008 | Egnal et al. |

OTHER PUBLICATIONS

Gallegher, Robert G., "Low-Density Parity-Check Codes," published 1963 by the M.I.T. Press Cambridge, Massachusetts, 102 pages.

Lin, Shy and Costello, Daniel J. (Jr)., "Error Control Coding Fundamentals and Applications," Prentice-Hall, Inc., Englewood Cliffs, NJ, 1983, ISBN 0-13-283796-X, pp. 274-277.

Williams, David, "Turbo Product Code Tutorial," May 1, 2000, Advanced Hardware Architecture, Inc., Pullman, WA. IEEE 802.16 Presentation Submission Template (Rev 8). Document No. IEEE 802.16t/00/01, 64 pages.

International Search Report and Written Opinion for International Application No. PCT/US07/69128, Applicant: Insitu, Inc., mailed Sep. 17, 2008, 11 pages.

Wikipedia—NASA Pathfinder—Helios Aircraft, http://en.wikipedia.org/w/index.php?title=NASA_Pathfinder&printable=yes, accessed Apr. 27, 2009, 10 pages.

Supplementary European Search Report and Written Opinion for EP07797541.5, Applicant: Insitu, Inc., mailed Mar. 3, 2016, 7 pages.

* cited by examiner

WIRELESSLY CONTROLLING UNMANNED AIRCRAFT AND ACCESSING ASSOCIATED SURVEILLANCE DATA

CROSS-REFERENCE TO RELATED APPLICATION

This is a continuation application of U.S. patent application Ser. No. 11/449,927, filed Jun. 9, 2006, entitled WIRELESSLY CONTROLLING UNMANNED AIRCRAFT AND ACCESSING ASSOCIATED SURVEILLANCE DATA.

TECHNICAL FIELD

The present invention is directed generally to systems and methods for wirelessly controlling unmanned aircraft and accessing associated surveillance data.

BACKGROUND

Unmanned aircraft or aerial vehicles (UAVs) provide enhanced and economical access to areas where manned flight operations are unacceptably costly and/or dangerous. For example, unmanned aircraft outfitted with remotely controlled cameras can perform a wide variety of surveillance missions, including spotting schools of fish for the fisheries industry, monitoring weather conditions, providing border patrols for national governments, and providing military surveillance before, during, and/or after military operations.

Existing techniques for controlling unmanned aircraft systems suffer from a variety of drawbacks. For example, existing unmanned aircraft systems (which can include the aircraft itself along with control devices, launch devices, recovery devices, and storage methods) are typically controlled using either direct RF communication or satellite communication. Direct RF-based control is limited by its short range and high power requirements. It also requires specialized equipment at both the UAV and the ground control station.

While controlling UAVs by satellite may allow for longer-range communications when compared with direct RF-based control, satellite control is typically limited by low bandwidth and low data rate limits. An example of a satellite-based control technique used in the past is Iridium. Iridium is a low-orbit satellite communications system that provides a long-range data connection at a rate of ~2.4 k bits per second. Not only does control by satellite have the drawback of limited bandwidth and low data rate, it also, like direct RF, typically involves high power requirements, high cost, and specialized equipment (e.g., relay stations and large dishes for transmit/receive).

DETAILED DESCRIPTION

I. Overview

Figure 1:
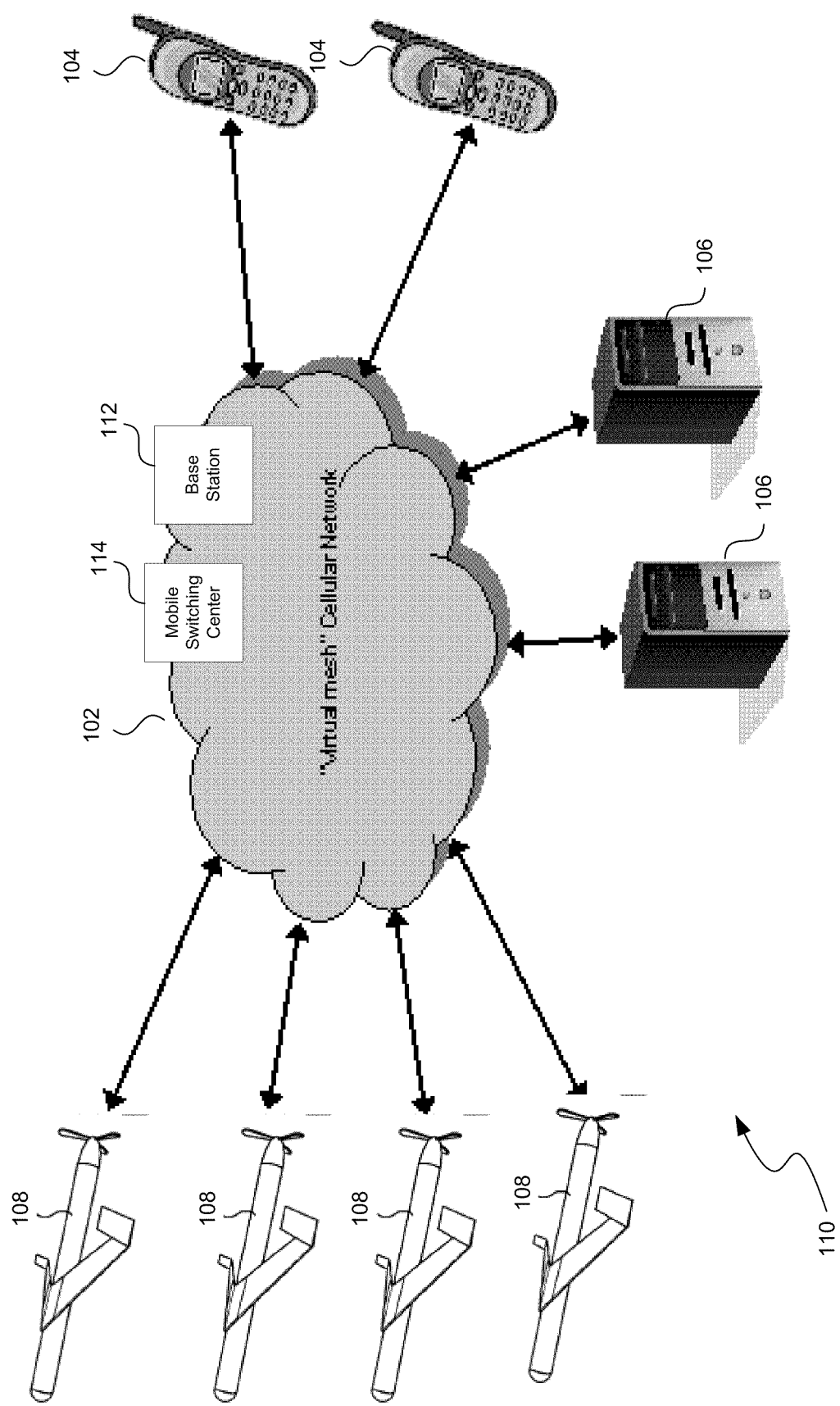
FIG. 1 is a system diagram showing an example of an environment in which a wireless telecommunication network is used along with mobile wireless devices and possibly other supporting technologies to communicate command and control data to one or more UAVs and/or to access and monitor signals and data transmitted from the UAVs in an embodiment of the invention.

Aspects of the invention are directed generally to systems and methods for wirelessly controlling unmanned aircraft and accessing associated surveillance and monitoring data. In one embodiment a wireless communication network (e.g., an existing cell phone network) is used along with handheld devices (cell phones or PDAs), and possibly other supporting technologies, to communicate command and control data to one or more UAVs and/or to monitor signals and data transmitted from UAVs. For example, this may include controlling the take off and/or landing of one or more UAVs, controlling the aerial maneuvers of one or more UAVs controlling the weapons systems of one or more UAVs, receiving mission surveillance information from one or more UAVs (including border surveillance information, tracking of moving or stationary subjects, etc.), receiving UAV health and/or status monitoring information, monitoring other aircraft in the area of one or more UAVs, etc. In this way, long-range communications can be achieved without having to design and build custom direct communications systems and without having to rely on expensive and complex satellite systems.

In some embodiments, the use of the wireless communication network and supporting devices provides nearly unlimited communication range capabilities within urban areas, where direct RF communication is typically inhibited by obstructions such as buildings and other large structures. Moreover, urban areas typically have dense pre-existing wireless communication capabilities due to the high demand for mobile phone service and related services in these areas.

While the supporting devices used to control the UAVs via the wireless communication network may be custom devices, pre-existing devices may also be used. For example, many off-the shelf wireless devices are highly programmable (e.g., due, in part, to programming languages like Java), support arbitrary user interfaces, and connect via wireless link to other devices including wireless devices (e.g., on the ground or in the air) and computer systems. Moreover, such wireless devices are typically small, portable, inexpensive, and have low power requirements.

In addition, because wireless network bandwidth is typically an order of magnitude larger than satellite bandwidth, the use of a wireless telecommunication network and supporting devices to control UAVs can allow for higher bandwidth, which translates directly into more responsive control and improved video quality and frame rates (e.g., for sending video back from a UAV). For example, current-generation wireless systems can run at ~300 k bits per second-compared with ~2.4 k bits per second for existing satellite systems.

II. System Architecture

FIGS. 1-4 and the following discussion provide a brief, general description of a suitable environment in which aspects of the invention can be implemented. Aspects of the invention may be stored or distributed on computer-readable media, including magnetically or optically readable computer disks, as microcode on semiconductor memory, nanotechnology memory, organic or optical memory, or other portable data storage media. Indeed, computer-implemented instructions, data structures, screen displays, and other data in accordance with aspects of the invention may be distributed over the Internet or over other networks (including wireless networks) on a propagated signal via a propagation medium (e.g., an electromagnetic wave(s), a sound wave, etc.) over a period of time, or on any analog or digital network (packet switched, circuit switched, or other scheme).

Aspects of the invention can be embodied in a special purpose computer or data processor that is specifically programmed, configured, or constructed to perform one or more of the computer-executable instructions explained in detail herein. Aspects of the invention can also be practiced in distributed computing environments where tasks or modules are performed by remote processing devices that are linked through a communication network. In a distributed computing environment, program modules may be located in both local and remote memory storage devices.

FIG. 1 is a system diagram showing an example of an environment in which a wireless telecommunication network 102 (e.g., an existing cellular network) is used along with mobile wireless devices 104 (e.g., cell phones and/or PDAs) and possibly other supporting technologies 106 (e.g., personal computers (PCs)), to communicate command and control data to one or more aircraft/UAVs 108 and/or to access and monitor signals and data transmitted from the UAVs 108. The UAVs 108, handheld wireless devices 104, and other supporting technologies 106 combine with the wireless telecommunication network 102 to form a type of mesh network 110.

Example implementations of the wireless telecommunication network 102 include UMTS (universal mobile telecommunication system), GSM (global system for mobile communications), GPRS (general packet radio service), EDGE (enhanced data rates for GSM evolution), CDMA (code division multiple access), IS-136/TDMA (time division multiple access), EV-DO (evolution-data optimized), analog, 3GSM (third generation global system for mobile communications), iDEN (integrated digital enhanced network), etc.

While not illustrated in detail, the wireless communication network may include components typical of most cellular networks, such as one or more base stations 112, mobile switching centers 114, home location registers (not shown), visitor location registers (not shown), wireless network databases (not shown), etc. An example of the frequencies on which channels of the mobile telecommunication network may operate include the typical American cell phone frequencies, which start at 824 MHz and end at 894 MHz.

The wireless telecommunication network 102 may also include various wired or partially wired networks, such as the Internet, a wired LAN (local area network), or even a public switched telephone network (PSTN). While not all types of networks are described here, aspects of the invention may be implemented within the framework of many types of networks (e.g., satellite, etc.). Because the extent of the typical wireless telecommunication network 102 is extremely large, effective communication ranges of thousands of miles may be practical. Furthermore, most wireless telecommunication networks are designed for low latency to support human voice-based conversation. This low latency enables fast system reaction time, even when nodes are located on opposite sides of the earth.

While not shown in detail in FIG. 1, in some embodiments, one or more of the three basic classes of devices (UAV 108, mobile device 104, computer/supporting device 106, or their hybrid derivatives such as cellular enabled PDA) may be connected to the cellular network indirectly via an RF-to-network bridge. Using the network-bridge configuration allows an aircraft to operate outside a cellular coverage area, but still be controlled by a mobile ground station or PC directly connected to the network. Alternatively, a PC may be operated from outside the cellular network to control a UAV operating within the network.

Many communication patterns are possible within the mesh network 110. For example, the mesh network 110 may facilitate aircraft-to-mobile device communication, where a user of the mobile device 104 (located on the ground and thereby comprising a ground control station) inputs commands into the mobile device 104 to control the aircraft/UAV 108 or access data collected by systems onboard the aircraft/UAV 108. In another example, the mesh network 110 facilitates aircraft-to-aircraft communication, which enables scenarios such as target handoff, collision avoidance, separation assurance, and flock behaviors. Where a more sophisticated user interface (UI) environment is desired than is typically available with a small mobile device, the mesh network 110 may support aircraft-to-computer communication, which may occur via the wireless network and/or via a wired network, such as the Internet. For example, a supporting technology 106 comprising a PC may have direct or indirect access to the wireless telecommunication network (e.g., via a network bridge) so that it operates as a stand-in for a mobile wireless device on the network.

Scenarios may also exist in the control of UAVs where a first user of a first mobile device wishes to communicate directly with a second user of a second mobile device (e.g., to communicate regarding a joint aircraft control strategy). Accordingly, the mesh network 110 can be used for mobile-to-mobile communication, which can be text- or even voice-based. Computer-to-computer communication may also be used in a similar context, where, for example, a PC or other supporting technology 106 is used as a stand-in for a mobile device on the wireless telecommunication network 102, for example, via an RF-to-network bridge.

The mesh network 110 may be utilized for communication from a mobile device 104 to a computer 106, for example, in contexts such as chat and target hand-off. Mobile device-to-computer communication may also be used when transferring information between a mobile device 104 and a computer or other supporting device 106. For example, this communication pattern may be used in the case where the mobile device 104 is used to establish a communication link with the UAV 108 but where a user interfaces with the computer/supporting device 106 when he or she needs a more robust user interface to, for example, input more complex control instructions or view graphically rich information transmitted from the UAV 108.

In some embodiments, a UAV 108 may operate outside the physical extent of a telecommunication network 102, for example, by communicating (e.g., via a proprietary communications system) with a ground station PC that is, itself, connected to the wireless telecommunication network 102. This configuration enables remote control of the UAV 108 by one or more mobile devices 104 within the wireless telecommunication network, even though the UAV 108 itself is outside the physical telecommunication network 102. In another embodiment, a UAV (e.g., instead of a ground station) serves as the bridge to the network. Thus, in this scenario, one aircraft 108 operating within range of the wireless telecommunication network 102 enables the controlling of an aircraft outside that range using mobile devices 104 within the wireless telecommunication network 102. Similarly, a UAV 108 may operate as a "cell tower" to dynamically extend the coverage area of a wireless telecommunication network 102.

In some embodiments, multiple simultaneous (or near simultaneous) calls are used between nodes within the mesh network 110. For example, multiple mobile devices can establish communication links with a single UAV, which can then stream different aspects of information to each mobile device. These aspects of information can eventually be consolidated back into a single data stream (e.g., for display at a computer). This multi-call configuration provides increased bandwidth (e.g., as may be required to pass full size and full frame rate digital video from a UAV 108 to a supporting device 106). Another way in which multiple calls can be used simultaneously (or near simultaneously) is to enhance composite link reliability. These calls can be routed through different base stations in the wireless telecommunication network 102 so that techniques for dynamic selection of the best quality link may be employed.

Figure 2:
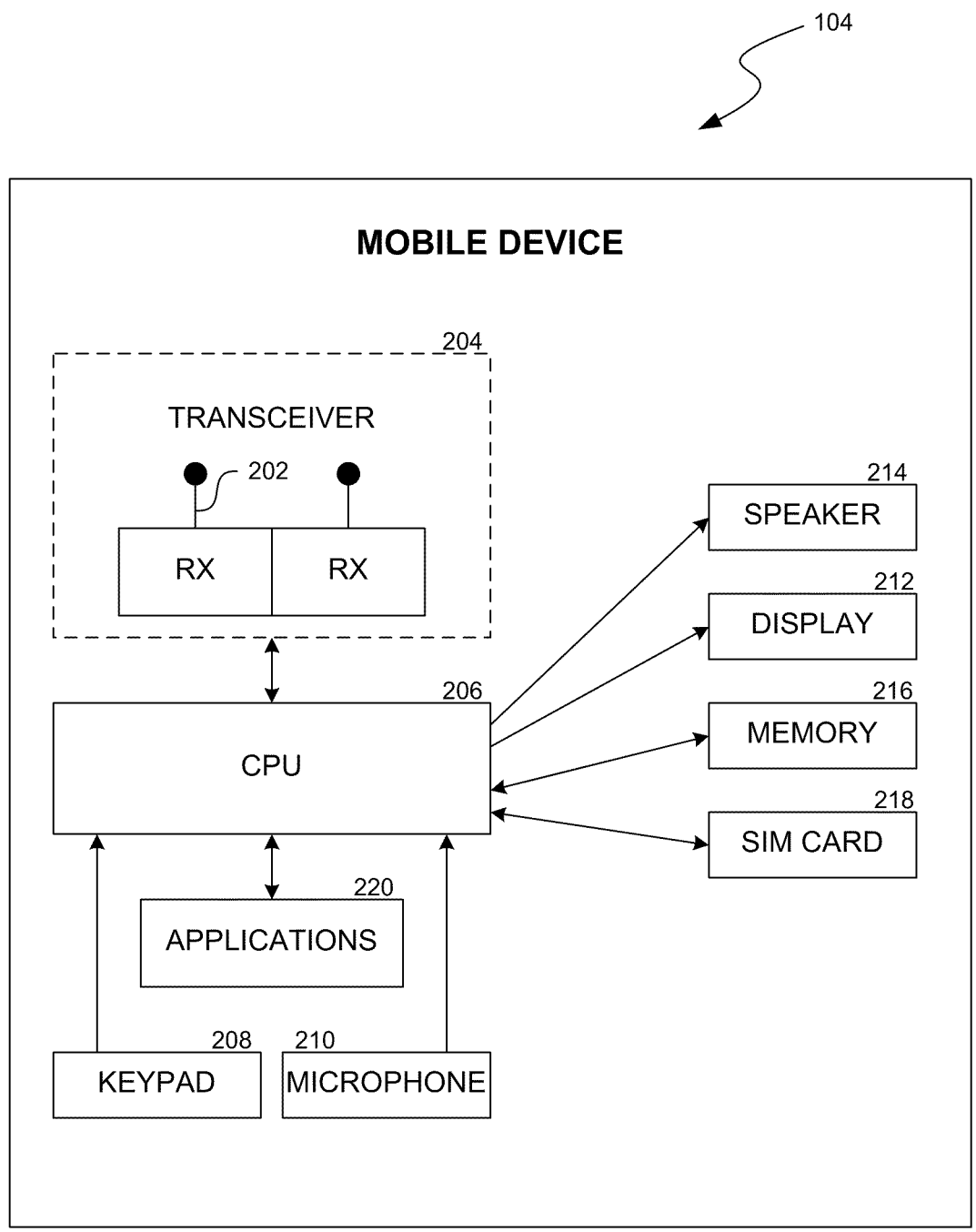
FIG. 2 is a block diagram showing an example of a mobile wireless device, such as the mobile wireless device of FIG. 1, that can be used as a ground control station for controlling a UAV via the wireless telecommunication network in an embodiment of the invention.

FIG. 2 is a block diagram showing an example of a mobile wireless device, such as the mobile wireless device 104 of FIG. 1. While a mobile phone is shown as the mobile wireless device 104 in FIGS. 1 and 2, those skilled in the relevant art will appreciate that the invention can be practiced with other devices and configurations, including mobile Internet appliances, hand-held devices, wearable computers, multi-processor systems, microprocessor-based or programmable consumer electronics, set-top boxes, PDAs, portable laptop computers, and the like. The term "mobile device" is intended to include all such devices.

The mobile device 104 has one or more internal or external antennas 202 for receiving and transmitting electromagnetic signals such as radio frequency signals. A transceiver 204 is connected to the antenna(s) 202 and typically provides modulation and demodulation of the transmitted and received signals, respectively. A processor unit 206 connected to the transceiver 204 may comprise a signal processor, microprocessor, ASIC, or other control and processing logic circuitry. The processor unit 206 may perform signal coding, data processing, input/output processing, power control, and other functions necessary for implementing a mobile communication device. A user (e.g., aircraft control personnel) may provide input to the processor unit 206 via a keypad 208, microphone 210, or display/touchpad 212. In turn, the processor unit 206 may provide information to the user via the display/touchpad 212 or a speaker 214.

The processor unit 206 may access information from, and store information in, a nonremovable memory 216 or a removable memory 218. The nonremovable memory 216 may consist of RAM, ROM, a hard disk, or other well-known memory storage technologies. The removable memory 218 may consist of Subscriber Identity Module (SIM) cards, which are well known in GSM communications systems, or other well-known memory storage technologies, such as "smart cards." Generic applications 220 such as wireless content browser applications and address book applications may be implemented in either the removable memory 218 or the nonremovable memory 216. The removable memory 218 and/or nonremovable member 216 may also be configured or programmed (e.g., using a mobile version of Java or in C/C++ on a mobile version of Linux) to support complex user interfaces and full color graphics. The removable memory 218 and/or nonremovable member 216 may also be configured or programmed to run an application (e.g., a Java program) that provides an aircraft and/or payload control and visualization, which may include functionality such as a moving, zoomable map. Alternatively, the mobile device 104 may be configured to have only a limited input interface and passively display relayed imagery.

Figure 3:
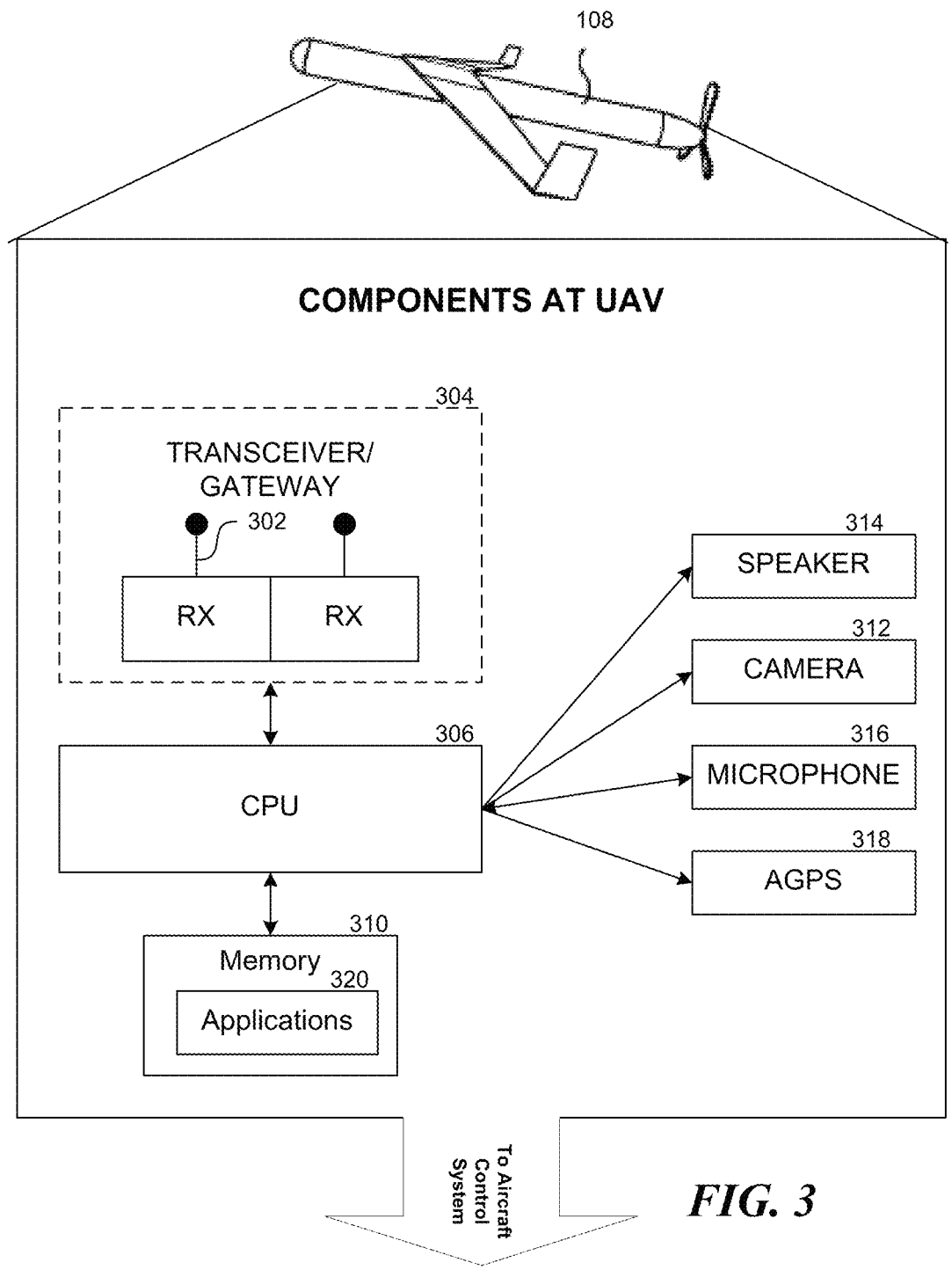
FIG. 3 is a block diagram showing an example of control components of a UAV, such as the UAV of FIG. 1, which can be used for communication via the wireless telecommunication network in an embodiment of the invention.

FIG. 3 is a block diagram showing an example of control components of a UAV, such as the UAV 108 of FIG. 1. In particular, the UAV may have several onboard components that allow it to be controlled via a wireless telecommunication network. The UAV may also have components associated with providing outgoing information. The outgoing information can include surveillance or aircraft monitoring information that can be transmitted back to a controlling device via a wireless telecommunication network. In some embodiments, some or all of these components may be associated with a consumer mobile device such as a camera-enabled cell phone, and thus, may be very similar to the components described with respect to the mobile device 104 of FIG. 2. Any one of these components may also be incorporated onto the UAV separately (as opposed to being packaged within a typical mobile device), and then connected using technology such as a USB.

The components may include a transceiver and/or gateway component 304 that is connected to one or more antenna(s) 302 and provides modulation and demodulation of transmitted and received signals so that the UAV may communicate via the wireless telecommunication network. A processor unit 306 connected to the transceiver 304 may comprise a signal processor, microprocessor, ASIC, or other control and processing logic circuitry. The processor unit 306 may perform signal coding, data processing, input/output processing, power control, and other functions necessary for implementing mobile communication onboard the UAV. Whether included on the mobile device or as a separate component, the processor unit 306 may take on several roles beyond "just" a communications processor. For example, it may be utilized as a flight computer, a mission computer, a navigation computer, or a video processor/preprocessor. The processor unit 306 may access information from, and store information in, memory 310, which can be a nonremovable memory or a removable memory (e.g., SIM card). Various generic and specialized applications 320 may be configured or programmed in memory as needed.

Cameras 312, including motion and/or still cameras (which are often now included on aftermarket mobile devices such as a picture phones), may replace more traditional imaging sensors on the UAV, thus providing an ultra compact ISR (intelligence, surveillance, and reconnaissance) UAV. For example, the mobile device's motion or still camera may be used to "see and avoid" other aircraft, or for imaging ground objects.

A microphone component 316, such as found in the typical cell phone, may be used to perform diagnostics, such as monitoring the UAV's engine health. This health monitoring information can then be passed via a voice channel to a mobile device that is being used to control the UAV (such as a mobile device at a ground station). In some embodiments, a standard cell phone microphone is replaced with any other appropriate transducer on the aircraft, such as an accelerometer, for measuring UAV body vibration. This signal may also be passed to the controlling mobile device over a voice channel or even a data channel of the telecommunication network. The microphone 316 may also be used to acquire aircraft telemetry or sensor data for transmission over the wireless communication link.

A speaker component 314, such as found in the typical cell phone, may be amplified and used like a public address system. In some scenarios, this may allow a remote human to talk to people within the field of view of the UAV camera, while remaining safely away from the area. In a military context, the speaker component 314 (or another mobile device-related component) on the UAV may be used to safely trigger improvised explosive devices (IEDs), by flying along roads and making calls. For example, the UAV may call the cell phone trigger on an enemy IED to trigger safely.

If equipped with mobile device components allowing it to perform assisted global positioning (AGPS), the AGPS function 318 may be used for UAV navigation via, for example, CDMA pilot tone measurements or actual GPS measurements. This provides an improvement in interference rejection compared to a stand-alone GPS receiver.

If the UAV is equipped with mobile device components allowing it to function as a "cell tower," the UAV may be configured to selectively place or block calls (e.g., for strategic purposes). The UAV may also be used to "sniff" the cell call activity for unauthorized calls in controlled areas, such as in war combat zones.

Figure 4:
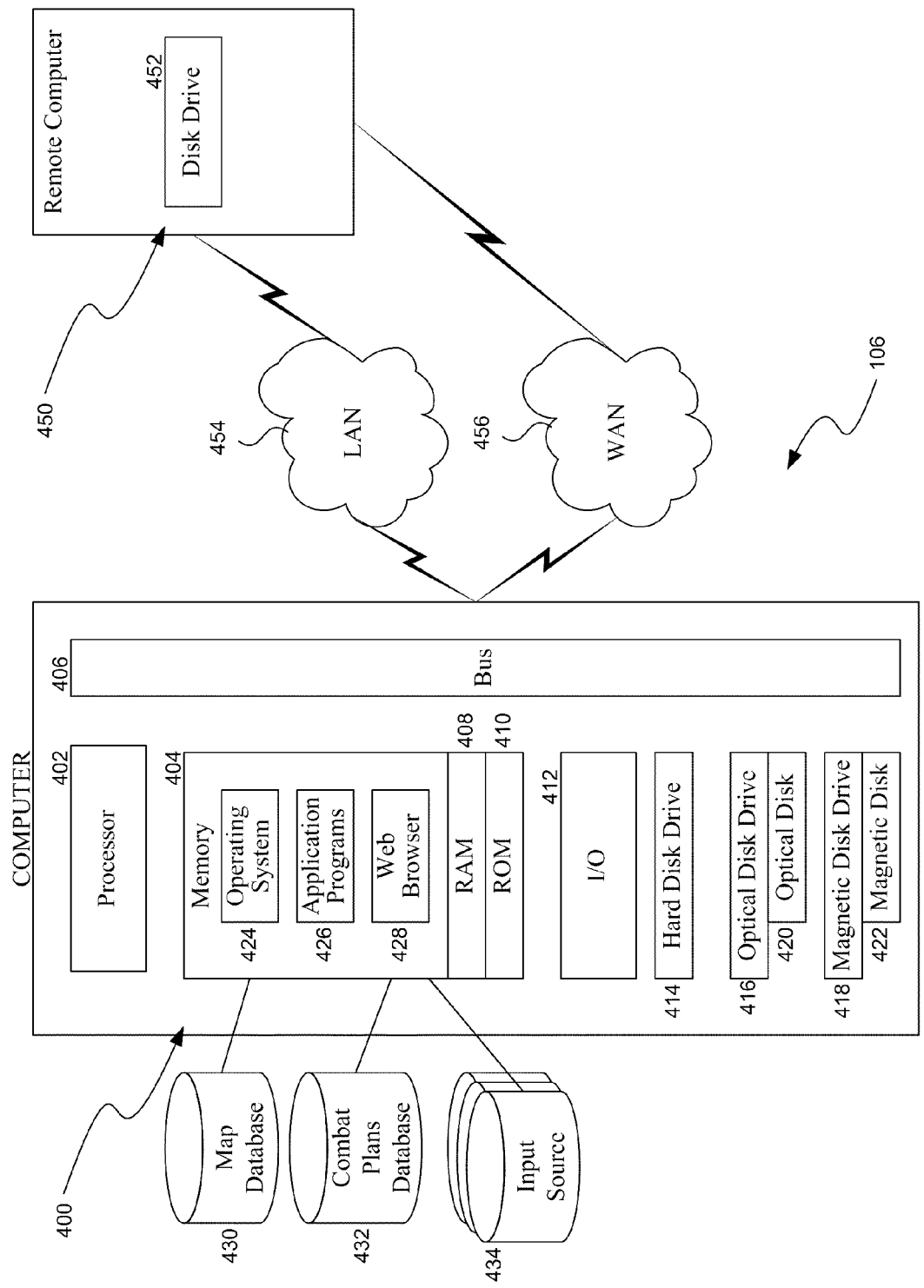
FIG. 4 is a block diagram showing an example of a computer, such as the supporting technology/computer of FIG. 1, which may also be used for communication via the wireless telecommunication network in an embodiment of the invention.

FIG. 4 is a block diagram showing an example of a computer 400, such as the supporting technology/computer 106 of FIG. 1, which may also be used to control the UAVs via the mobile telecommunication network. As with most conventional computers, the computer 400 may include a processing unit 402, a system memory 404, and a system bus 406 that couples various system components including the system memory to the processing unit. The processing unit 402 may be any logic processing unit, such as one or more central processing units (CPUs), digital signal processors (DSPs), application-specific integrated circuits (ASIC), etc. Unless described otherwise, the construction and operation of the various blocks shown in FIG. 4 are of conventional design. As a result, such blocks need not be described in further detail herein, as they will be readily understood by those skilled in the relevant art.

The system bus 406 can employ any known bus structures or architectures, including a memory bus with memory controller, a peripheral bus, and a local bus. The system memory 404 includes random access memory ("RAM") 408 and read-only memory ("ROM") 410. A basic input/output system (I/O) 412, which can form part of the ROM 410, contains basic routines that help transfer information between elements within the computer 400, such as during start-up. The hardware elements of the input/output system 412 allow a user to enter commands and information into the computer 400 through input devices such as a keyboard, a pointing device such as a mouse, or other input devices including a microphone, joystick, game pad, scanner, etc. (all not shown). These and other input devices are connected to the processing unit 402 through an interface such as a serial port interface that couples to the bus 406, although other interfaces such as a parallel port, game port, or universal serial bus ("USB") can be used. For example, other hardware devices, such as a PCMCIA reader that receives a card, can be coupled to the interface. A monitor or other display device is coupled to the bus 406 via a video interface, such as a video adapter. The computer 400 can include other output devices, such as speakers, printers, etc.

The computer 400 also includes a hard disk drive 414 for reading from and writing to a hard disk (not shown), and an optical disk drive 416 and a magnetic disk drive 418 for reading from and writing to removable optical disks 420 and magnetic disks 422, respectively. The optical disk 420 can be a CD-ROM, while the magnetic disk 422 can be a magnetic floppy disk. The hard disk drive 414, optical disk drive 416, and magnetic disk drive 418 communicate with the processing unit 402 via the bus 406. The hard disk drive 414, optical disk drive 416, and magnetic disk drive 418 may include interfaces or controllers (not shown) coupled between such drives and the bus 406, as is known by those skilled in the art. The drives 414, 416, and 418, and their associated computer-readable media, provide nonvolatile storage of computer-readable instructions, data structures, program modules, and other data for the computer 400. Although the depicted computer 400 employs a hard disk, optical disk 420, and magnetic disk 422, those skilled in the relevant art will appreciate that other types of computer-readable media that can store data accessible by a computer may be employed, such as magnetic cassettes, flash memory cards, digital video disks ("DVD"), Bernoulli cartridges, RAMs, ROMs, smart cards, nanotechnology memory, etc.

Program modules can be stored in the system memory 404, such as an operating system 424 and other application programs 426 that enable the control of UAVs and that allow for data received from UAVs to be readily accessed in a convenient format. The system memory 404 may also include a web browser 428 for permitting the computer 400 to access and exchange data with web sites in the World Wide Web of the Internet. The application programs 426 may have access to one or more databases, which may be internal or external to the computer. For example, the computer may have access to a map database 430 (which stores maps for areas where UAVs are operated), a combat plans database 432 (which stores combat plans for UAVs operating in a military context), and multiple other input source databases 434.

The computer 400 can operate in a networked environment using logical connections to one or more remote computers, such as a remote computer 450. For example, the computer 400 may be involved in performing a first set of tasks in a workflow and the remote computer 450 may be involved in performing a second set of tasks in the workflow. In another example, the remote computer 450 offers an input source for a workflow facility hosted at the computer 400. Likewise, the computer 400 may be involved in designing workflows having tasks to be performed by the remote computer 450. Like the computer 400, the remote computer 450 can be a personal computer, a server, a router, a network PC, a peer device, or other common network node, and typically includes many or all of the elements described above for the computer 400. Typically, the remote computer 450 includes a memory storage device such as a disk drive 452. The remote computer 450 may be logically connected to the computer 400 via any known method that permits computers to communicate, such as through a local area network ("LAN") 454 or a wide area network ("WAN") or Internet 456. Such networking environments are well known in offices, enterprise-wide computer networks, intranets, and the Internet.

In a LAN networking environment, the computer 400 is connected to the LAN 454 through an adapter or network interface (coupled to the bus 406). When used in a WAN networking environment, the computer 400 often includes a modem or other device for establishing communications over the WAN/Internet 456. In a networked environment, program modules, application programs, or data, or portions thereof, can be stored in the remote computer 450, such as in the disk drive 452. Those skilled in the relevant art will readily recognize that the network connections shown in FIG. 4 are only some examples of establishing communication links between computers, and other links may be used, including wireless links. In general, while hardware platforms, such as the computer 400 and remote computer 450, are described herein, aspects of the invention are equally applicable to nodes on a network having corresponding resource locators to identify such nodes.

III. System Flows

FIGS. 5 through 8 are representative flow diagrams that show processes that occur within the environment of FIG. 1. These flow diagrams do not show all functions or exchanges of data but, instead, provide an understanding of commands and data exchanged under the system. Those skilled in the relevant art will recognize that some functions or exchanges of commands and data may be repeated, varied, omitted, or supplemented, and other aspects not shown may be readily implemented. For example, while not described in detail, a message containing data may be transmitted through a message queue, over HTTP, etc.

Figure 5:
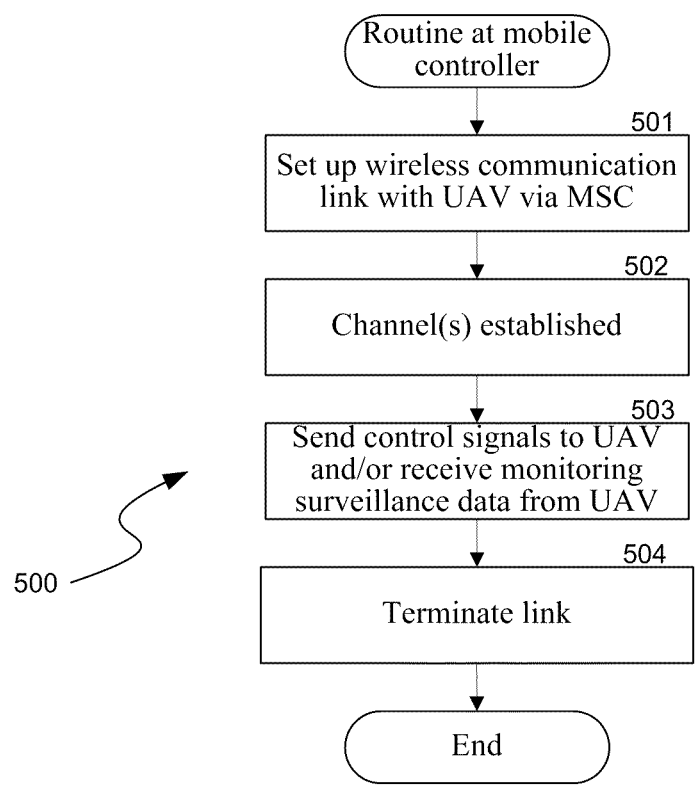
FIG. 5 is a flow chart showing an example of a routine performed at a mobile device used for controlling a UAV via the wireless telecommunication network in an embodiment of the invention.

FIG. 5 is a flow chart showing an example of a routine 500 performed at a mobile device used for controlling a UAV. For example, the mobile device may be a mobile phone configured as a ground control station, which can be operated by a user to send control signals to the UAV and/or receive data back from the UAV, such as monitoring and surveillance data.

At block 501, the routine 500 sets up a wireless communication link with the UAV on the wireless communication network. For example, this may include communication (e.g., via a control channel) with a mobile switching center that is associated with the wireless communication network. As a result of this communication, both the mobile device and the UAV may receive channel assignment information from the mobile switching center that permits access to one or more channels of the wireless communication link, including one or more voice channels and/or data channels. At block 502, the routine 500 receives the channel assignment information, thereby establishing an active communication link via one or more designated communication channels. At block 503, the routine 500 sends control signals to the UAV (e.g., instructions to control the activities of the UAV, including its direction and speed of travel, weapons discharge, etc.) and/or receives data back from the UAV (e.g., surveillance information, video information, UAV health monitoring information, etc.). The format and types of information communicated via the established communication link may include voice (or other audio) data, image data, video data, binary data, text data, etc., depending on system and network configurations. At block 504, assuming the session with the UAV has ended (e.g., the UAV has safely landed), the routine 500 terminates the communication link, thereby ending the UAV session.

Figure 6:
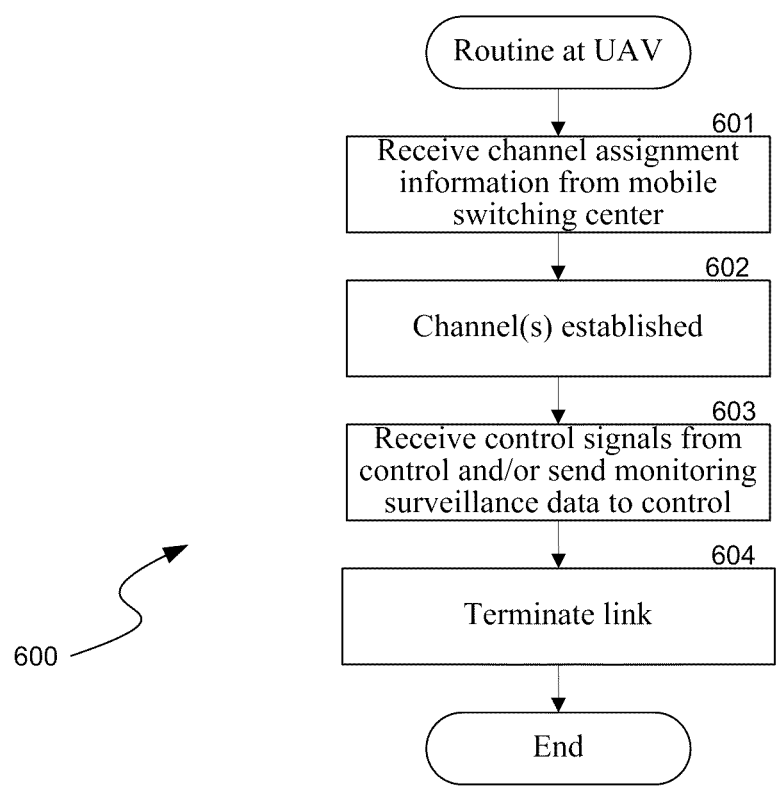
FIG. 6 is a flow chart showing an example of a routine performed by a collection of one or more components onboard a UAV, which enable the UAV to communicate via the wireless telecommunication network in an embodiment of the invention.

FIG. 6 is a flow chart showing an example of a routine 600 performed by a collection of one or more components onboard a UAV, which enable the UAV to communicate via a wireless telecommunication network. For example, the collection of components may be packaged together as a mobile device, such as a cell phone, which is connected to other control and/or surveillance systems of the UAV (e.g., via a connection such as a USB bus).

At block 601, the routine 600 receives channel assignment information for establishing a wireless communication link with a control device (such as a ground-based mobile telephone) via the wireless telecommunication network. For example, this may involve communication (e.g., via a control channel) with a mobile switching center associated with the wireless communication network to receive channel assignment information relating to one or more voice channels and/or data channels. At block 602, the routine 600 establishes an active communication link via the one or more channels. At block 603, the routine 600 receives control signals (e.g., instructions to control the activities of the UAV, including its direction and speed of travel, weapons discharge, etc.) sent from the ground-based mobile telephone. In addition or alternatively, at block 603 the routine 600 may send data (e.g., surveillance information, video information, UAV health monitoring information, etc.) back to the ground-based mobile control device. The format and types of information communicated via the established communication link may include voice (or other audio) data, image data, video data, binary data, text data, etc., depending on system and network configurations. At block 604, assuming the session with the UAV has ended (e.g., the UAV has safely landed) the routine 600 receives a termination signal for terminating the communication link, thereby ending the communication session.

Figure 7:
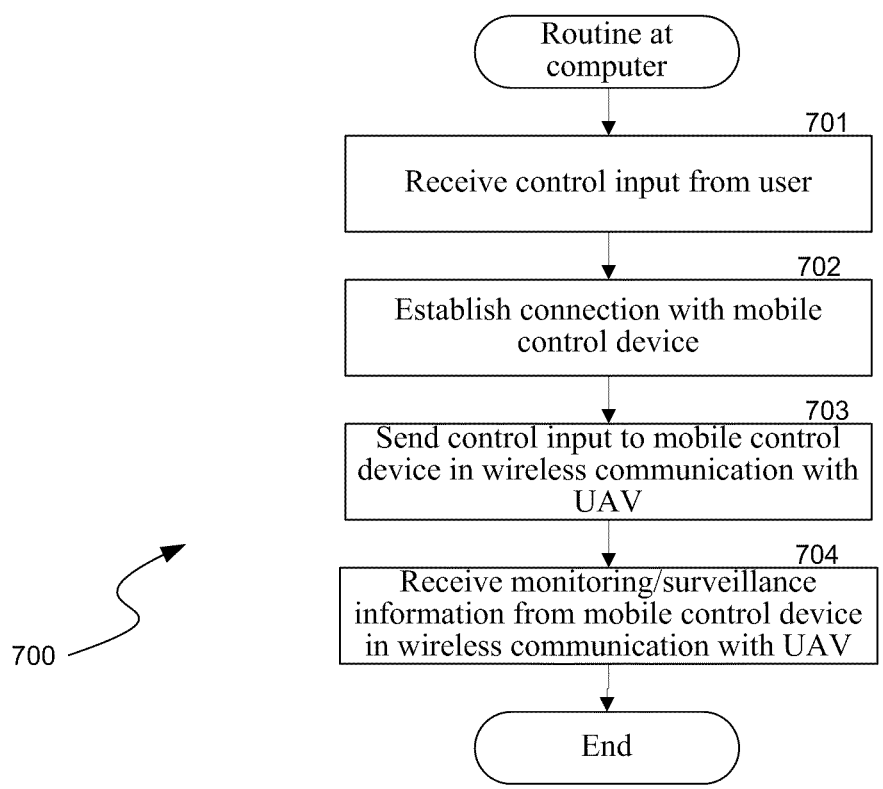
FIG. 7 is a flow chart showing an example of a routine performed by a computer that is capable of establishing a wireless communication link (via a wireless telecommunication network) to control one or more UAVs or, alternatively, is wirelessly connected to a mobile wireless communication device that is, in turn, used to communicate with one or more UAVs via the wireless telecommunication network in an embodiment of the invention.

FIG. 7 is a flow chart showing an example of a routine 700 performed by a computer that is capable of establishing a wireless communication link (via a wireless telecommunication network) to control one or more UAVs or, alternatively, a computer that can establish a connection (e.g., wireless, wired, Bluetooth, infrared, etc.) to a mobile wireless communication device that is, in turn, used to communicate with one or more UAVs via the wireless telecommunication network. In either scenario, the computer allows for a robust user interface from which a user can easily provide control commands to a UAV, monitor the UAV, and/or receive data feeds (e.g., video surveillance, imagery, health monitoring, etc.) from the UAV.

At block 701, the routine 700 receives control input from a user wishing to control the UAV via an interface provided by an application running at the computer. At block 702, the routine 700 establishes either an indirect or direct connection with the UAV. For example, the computer may be able to establish a WAN-type connection with components of the wireless telecommunication network (e.g., base station and mobile switching center), so that the computer can communicate as a stand-in for a traditional wireless communication device, thereby connecting more or less directly with the UAV via a partially wireless connection. In another arrangement, the routine 700 may establish a communication link (wired or wireless) with a mobile device that can, in turn, communicate with the UAV via a wireless connection, such as is described with respect to FIG. 5. At block 703, the routine 700 sends control input to the UAV (or the intermediary mobile device) at least in part via the wireless communication network. At block 704, the routine 700 receives surveillance and/or monitoring data from the UAV (or via the intermediary mobile device) at least in part via the wireless communication network. The routine 700 then ends.

Figure 8:
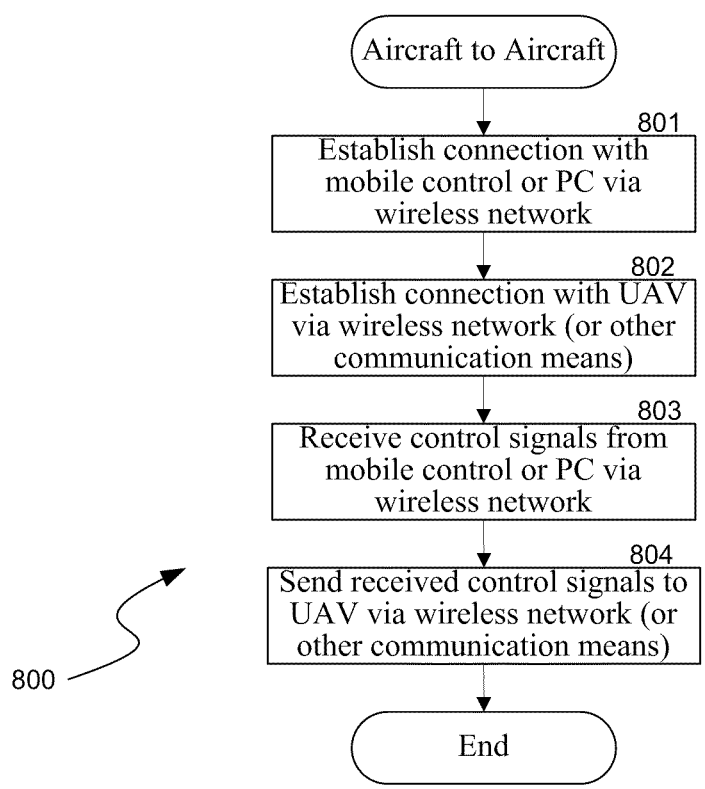
FIG. 8 is a flow chart showing an example of a routine performed onboard an aircraft that is capable of forming a network bridge that enables communication of control devices with other aircraft, such as UAVs that are otherwise outside the wireless telecommunication network in an embodiment of the invention.

FIG. 8 is a flow chart showing an example of a routine 800 performed onboard an aircraft that is capable of forming a network bridge that enables communication of control devices with other aircraft, such as UAVs that are otherwise outside a mobile telecommunication network. In another example, the aircraft is a leading unit for a group of multiple aircraft that are each configured to perform joint aerial maneuvers (e.g., led by the leading unit).

At block 801, the routine 800 establishes a wireless connection with a ground control device (such as a wireless telecommunication device at a ground station or a PC) via the mobile telecommunication network. Examples of establishing such a wireless connection were described in more detail above with respect to FIGS. 5 and 7. At block 802, the routine 800 establishes a communication link with one or more UAVs (e.g., UAVs that are outside the telecommunication network or UAVs that are part of a group of multiple aircraft that are configured to perform joint aerial maneuvers). This connection may be via the mobile telecommunication network or via some other form of wireless communication (e.g., direct RF, infrared, Bluetooth, etc.). At block 803, the routine 800 receives control signals from the ground control device. At block 804, based on the received control signals, the routine 800 passes along appropriate control signals to the one or more UAVs. Block 804 of the routine 800 may also be reversed so that the UAV receives data from the one or more UAVs to pass back to the ground control station. The routine 800 then ends when the control session ends or when the communication session is otherwise terminated.

IV. Conclusion

From the foregoing, it will be appreciated that specific embodiments of the invention have been described herein for purposes of illustration, but that various modifications may be made without deviating from the invention. For example, while certain telecommunication networks are described with respect to various embodiments, aspects of the invention may be implemented on a variety of wireless networks. Other aspects that may vary include the type and makeup of devices used to control UAVs, as well as the systems on board the UAVs themselves. Aspects of the invention described in the context of particular embodiments may be combined or eliminated in other embodiments. Further, while advantages associated with certain embodiments of the invention have been described in the context of those embodiments, other embodiments may also exhibit such advantages, and not all embodiments need necessarily exhibit such advantages to fall within the scope of the invention. Accordingly, the invention is not limited except as by the appended claims.

We claim:

1. A method for controlling an unmanned aerial vehicle (UAV), the method comprising:
   receiving by a first UAV a control message transmitted over a wireless connection from a control device;
   transmitting the received control message by the first UAV to a second UAV via a pre-existing cellular network configured primarily for mobile telephone communication so that the received control message is relayed from the first UAV to the second UAV via the pre-existing cellular network configured primarily for mobile telephone communication; and
   receiving compressed digital video transmissions at the first UAV via a transmitter located at the second UAV.

2. The method of claim 1, further comprising:
   establishing an ongoing connection between a wireless device transmitting the control message to the first UAV and a receiver at the first UAV.

3. The method of claim 1, further comprising:
   receiving at the first UAV surveillance information collected by the second UAV, via the transmitter located at the second UAV.

4. The method of claim 1, further comprising:
   receiving at the first UAV health and/or status information associated with the second UAV, via the transmitter located at the second UAV.

5. The method of claim 4, further comprising:
   receiving audio data from an onboard microphone of the first UAV; and
   monitoring engine health of the first UAV based at least in part on the received audio data.

6. The method of claim 1 wherein the pre-existing cellular network configured primarily for mobile telephone communication is a pre-existing cellular network configured primarily for mobile telephone communication that includes a ground-based node or a ground-based base station so that the received control message is relayed from the first UAV to the second UAV via the ground-based node or the ground-based base station.

7. The method of claim 1, wherein the pre-existing cellular network configured primarily for mobile telephone communication includes a global system for mobile communications (GSM) network.

8. The method of claim 1 wherein the pre-existing cellular network configured primarily for mobile telephone communication includes a general packet radio service (GPRS) network.

9. The method of claim 1 wherein the pre-existing cellular network configured primarily for mobile telephone communication includes a code division multiple access (CDMA) network.

10. The method of claim 1 wherein the pre-existing cellular network configured primarily for mobile telephone communication includes an evolution-data optimized (EV-DO) network.

11. The method of claim 1 wherein the pre-existing cellular network configured primarily for mobile telephone communication includes an enhanced data rates for GSM evolution (EDGE) network.

12. The method of claim 1 wherein the pre-existing cellular network configured primarily for mobile telephone communication includes a third generation global system for mobile communications (3GSM) network.

13. The method of claim 1 wherein the pre-existing cellular network configured primarily for mobile telephone communication includes a digital IS-136/time division multiple access (IS-136/TDMA) network.

14. The method of claim 1 wherein the pre-existing cellular network configured primarily for mobile telephone communication includes an integrated digital enhanced network (iDEN).

15. A method for controlling an unmanned aerial vehicle (UAV), the method comprising:
receiving by a first UAV a control message transmitted over a wireless connection from a control device;
transmitting the received control message by the first UAV to a second UAV via a pre-existing cellular network configured primarily for mobile telephone communication so that the received control message is relayed from the first UAV to the second UAV via the pre-existing cellular network configured primarily for mobile telephone communication; and
receiving full size and full frame rate digital video transmissions at the first UAV via a transmitter located at the second UAV.

16. A method for controlling an unmanned aerial vehicle (UAV), the method comprising:
receiving by a first UAV a control message transmitted over a wireless connection from a control device;
transmitting the received control message by the first UAV to a second UAV via a pre-existing cellular network configured primarily for mobile telephone communication so that the received control message is relayed from the first UAV to the second UAV via the pre-existing cellular network configured primarily for mobile telephone communication; and
receiving at the first UAV, via a transmitter located at the second UAV, surveillance information collected by the second UAV, wherein the collected information includes information associated with a third UAV collected for the purpose of avoiding airspace conflicts, conducting joint surveillance of a geographical area, and/or conducting joint tracking of a subject.

17. A method for controlling an unmanned aerial vehicle (UAV), the method comprising:
receiving by a first UAV a control message transmitted over a wireless connection from a control device;
transmitting the received control message by the first UAV to a second UAV via a pre-existing cellular network configured primarily for mobile telephone communication so that the received control message is relayed from the first UAV to the second UAV via the pre-existing cellular network configured primarily for mobile telephone communication;
receiving at the first UAV communications from a transmitter located at the second UAV; and
transmitting by the first UAV the communications from the second UAV.

18. The method of claim 17 wherein receiving communications from the transmitter includes receiving communications directly from the second UAV.

19. The method of claim 17, further comprising:
transmitting a message originated by a first user to a second user via at least one of: the first UAV or the second UAV.

20. The method of claim 17, further comprising:
receiving, at the first UAV, messages from each of a plurality of remote control devices.

21. The method of claim 20, further comprising:
combining the messages received from at least two of the plurality of remote control devices into a single data stream.

22. The method of claim 17 wherein at least one of the first UAV or the second UAV is configured to communicate with multiple base stations.

23. The method of claim 17, wherein the first UAV comprises a component configured to block traffic on the pre-existing cellular network.

24. The method of claim 17, wherein the first UAV comprises a component configured to sniff traffic on the pre-existing cellular network.

25. A computer-readable medium containing instructions for controlling an unmanned aerial vehicle (UAV), by operations comprising:
receiving a control message at a first UAV and over a wireless connection; and
transmitting the received control message to a second UAV via a pre-existing cellular telephone network, so that the received control message is relayed to the second UAV; and
receiving compressed digital video transmissions from the second UAV.

26. A computer-readable medium containing instructions for controlling an unmanned aerial vehicle (UAV), by operations comprising:
receiving a control message at a first UAV and over a wireless connection; and
transmitting the received control message to a second UAV via a pre-existing cellular telephone network, so that the received control message is relayed to the second UAV; and
receiving full size and full frame rate digital video transmissions from the second UAV.

27. The computer-readable medium of claim 26, wherein the operations further comprise:
establishing an ongoing connection between a wireless device transmitting the control message to the first UAV and a receiver at the first UAV.

28. The computer-readable medium of claim 26, wherein, the operations further comprise:
receiving surveillance information collected by the second UAV.

29. The computer-readable medium of claim 26, wherein the operations further comprise:
receiving surveillance information collected by the second UAV, wherein the collected information includes information associated with a third UAV and is collected for the purpose of avoiding airspace conflicts, conducting joint surveillance of a geographical area, and/or conducting joint tracking of a subject.

30. The computer-readable medium of claim 26, wherein the operations further comprise:
receiving, at a ground station, communications directly from the second UAV.

31. The computer-readable medium of claim 26, wherein the wireless connection is provided by a wireless network configured primarily for mobile telephone communications.

32. A computer-readable medium containing instructions for controlling an unmanned aerial vehicle (UAV), by operations comprising:
receiving a control message at a first UAV and over a wireless connection; and transmitting the received control message to a second UAV via a pre-existing cellular telephone network, so that the received control message is relayed to the second UAV; and receiving health and/or status information associated with the second UAV, wherein the health and/or status information is collected during a diagnostics monitoring process performed ad the second UAV.

33. A computer-readable medium containing instructions for controlling an unmanned aerial vehicle (UAV), by operations comprising:

receiving a control message at a first UAV and over a wireless connection;

transmitting the received control message to a second UAV via a pre-existing cellular telephone network, so that the received control message is relayed to the second UAV; and receiving, at a ground station, communications from the second UAV via the first UAV.

34. A system for controlling an unmanned aerial vehicle (UAV) comprising:

a transceiver arranged configured to:

receive a control message at a first UAV and over a wireless connection;

transmit the received control message from the first UAV to a second UAV via a pre-existing cellular telephone network, wherein the control message specifies instructions to control activities of the second UAV; and receive communications from a transmitter located at the second UAV, wherein the communications from the transmitter include compressed digital video transmissions.

35. The system of claim 34 wherein the communications from the transmitter include surveillance information collected by the second UAV.

36. The system of claim 34 wherein the communications from the transmitter include surveillance information collected by the second UAV, wherein the collected information includes information associated with a third UAV and is collected for the purpose of avoiding airspace conflicts, conducting joint surveillance of a geographical area, and/or conducting joint tracking of a subject.

37. The system of claim 34, wherein the wireless connection is provided by a wireless network configured primarily for mobile telephone communications.

38. A system for controlling an unmanned aerial vehicle (UAV) comprising:

a transceiver arranged configured to:

receive a control message at a first UAV and over a wireless connection;

transmit the received control message from the first UAV to a second UAV via a pre-existing cellular telephone network, wherein the control message specifies instructions to control activities of the second UAV; and receive communications from a transmitter located at the second UAV, wherein the communications from the transmitter include full size and full frame rate digital video transmissions.

39. A system for controlling an unmanned aerial vehicle (UAV) comprising:

a transceiver arranged configured to:

receive a control message at a first UAV and over a wireless connection;

transmit the received control message from the first UAV to a second UAV via a pre-existing cellular telephone network, wherein the control message specifies instructions to control activities of the second UAV; and receive communications from a transmitter located at the second UAV, wherein the communications from the transmitter include diagnostics information associated with the second UAV.

40. A method for controlling an unmanned aerial vehicle (UAV) comprising:

receiving by a first UAV a control message transmitted over a wireless connection from a control device; and transmitting the received control message by the first UAV to a second UAV via a pre-existing cellular network configured primarily for mobile telephone communication so that the received control message is relayed from the first UAV to the second UAV via the pre-existing cellular network configured primarily for mobile telephone communication, wherein the received control message is for directly controlling the second UAV.

41. The method of claim 40 wherein the control message specifies instructions to control surveillance activities of the second UAV.

42. A computer-readable medium containing instructions for controlling an unmanned aerial vehicle (UAV), by operations comprising:

receiving a control message at a first UAV and over a wireless connection; and transmitting the received control message to a second UAV via a pre-existing cellular telephone network, so that the received control message is relayed to the second UAV, wherein the received control message is for directly controlling the second UAV.

43. A system for controlling an unmanned aerial vehicle (UAV) comprising:

a transceiver arranged configured to:

receive a control message at a first UAV and over a wireless connection;

transmit the received control message from the first UAV to a second UAV via a pre-existing cellular telephone network, wherein the control message specifies instructions to control activities of the second UAV; and receive communications from a transmitter located at the second UAV, wherein the received control message is for directly controlling the second UAV.

44. A method for controlling an unmanned aerial vehicle (UAV) comprising:

receiving by a first UAV a control message transmitted over a wireless connection from a control device; and transmitting the received control message by the first UAV to a second UAV via a pre-existing cellular network configured primarily for mobile telephone communication so that the received control message is relayed from the first UAV to the second UAV via the pre-existing cellular network configured primarily for mobile telephone communication, wherein the received control message is for directly controlling a third UAV.

45. A method for controlling an unmanned aerial vehicle (UAV) comprising:

receiving by a first UAV a control message transmitted over a wireless connection from a control device; and transmitting the received control message by the first UAV to a second UAV via a pre-existing cellular network configured primarily for mobile telephone communication so that the received control message is relayed from the first UAV to the second UAV via the pre-existing cellular network configured primarily for mobile telephone communication, wherein the control message specifies instructions to control activities of a weapons system of the second UAV.

46. A system, having a memory and a processor, for controlling an unmanned aerial vehicle (UAV) comprising:
a component configured to receive a control message at a first UAV and over a wireless connection; and
a component configured to transmit the received control message from the first UAV to a second UAV via a pre-existing cellular telephone network configured primarily for mobile telephone communication, wherein the control message specifies instructions to control activities of the second UAV,
a component configured to receive compressed digital video transmissions at the first UAV via a transmitter located at the second UAV.

47. The system of claim 46, further comprising:
a component configured to receive communications from a transmitter located at the second UAV.

* * * * *